(12) United States Patent
Cao et al.

(10) Patent No.: US 11,409,632 B1
(45) Date of Patent: Aug. 9, 2022

(54) RESILIENCE TESTING ENGINE IN A DATABASE SYSTEM

(71) Applicant: Snowflake Inc., Bozeman, MT (US)

(72) Inventors: Yuchen Cao, Foster City, CA (US); Stephen Mark Andrew Clark, Menlo Park, CA (US); Prasanna Kumar Krishnamurthy, Sunnyvale, CA (US); Supriya Vasudevan, San Jose, CA (US); Jinzhou Yang, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/652,902

(22) Filed: Feb. 28, 2022

(51) Int. Cl.
*G06F 11/00* (2006.01)
*G06F 11/36* (2006.01)
*G06F 16/21* (2019.01)

(52) U.S. Cl.
CPC ...... *G06F 11/3612* (2013.01); *G06F 11/3684* (2013.01); *G06F 11/3688* (2013.01); *G06F 16/217* (2019.01)

(58) Field of Classification Search
CPC ............. G06F 11/3612; G06F 11/3684; G06F 11/3688; G06F 16/217
See application file for complete search history.

(56) References Cited

U.S. PATENT DOCUMENTS

| 6,606,395 B1* | 8/2003 | Rasmussen | ............ B41J 29/393 |
| | | | 358/3.1 |
| 11,030,077 B1* | 6/2021 | Kwan | ................. G06F 11/3692 |
| 2006/0253741 A1* | 11/2006 | Garakani | ............ G06F 11/3692 |
| | | | 714/38.11 |

OTHER PUBLICATIONS

"U.S. Appl. No. 17/654,884, Non-Final Office Action dated May 19, 2022", 6 pgs.
"U.S. Appl. No. 17/654,884, Response filed May 24, 22 to Non-Final Office Action dated May 19, 2022", 9 pgs.

* cited by examiner

*Primary Examiner* — Joshua P Lottich
(74) *Attorney, Agent, or Firm* — Schwegman Lundberg & Woessner, P.A.

(57) ABSTRACT

Provided herein are systems and methods for resilience testing. A system includes at least one hardware processor coupled to a memory and configured to decode a workflow to obtain a workload specification and a network experiment specification. A first set of containers is configured to execute one or more workloads on a testing node. The one or more workloads are defined by the workload specification. A second set of containers is configured to execute one or more network experiments on the testing node. The one or more network experiments are based on the network experiment specification. Execution of the one or more network experiments triggers an error condition on the testing node. A notification is generated based on at least one metric associated with execution of the one or more workloads and the one or more network experiments.

30 Claims, 8 Drawing Sheets

RESILIENCE TESTING ENGINE IN A DATABASE SYSTEM

TECHNICAL FIELD

Embodiments of the disclosure relate generally to databases and, more specifically, to resilience testing in a database system.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed.

With the rapid growth of cloud-based data warehouse technology and products, stability and resiliency become critical factors for each system component in addition to the overall deployment. As database systems and infrastructures will occasionally fail or malfunction without warnings, robust and comprehensive resilience plans in each level (e.g., feature, component, layer, and system-level) can be used to ensure such incidents do not cause service disruptions for customers and providers of database services in multi-tenant cloud environments.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
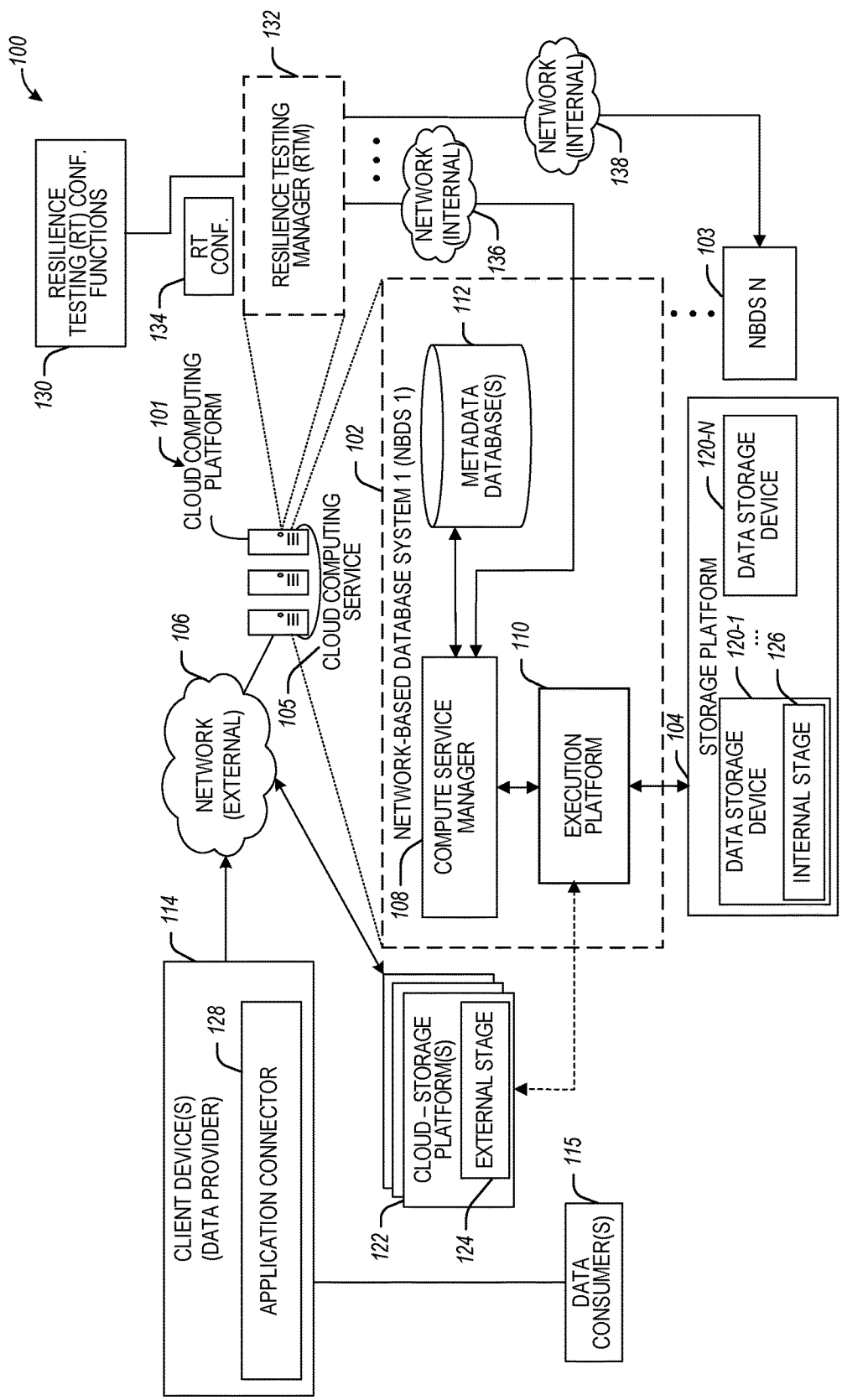
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform may include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth. As used herein, the terms "account object metadata" and "account object" are used interchangeably.

In an implementation of a data platform, a given database (e.g., a database maintained for a customer account) may reside as an object within, e.g., a customer account, which may also include one or more other objects (e.g., users, roles, grants, shares, warehouses, resource monitors, integrations, network policies, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

As discussed herein, the phrase "container image" refers to a software package (e.g., a static image) that includes configuration information for deploying an application, along with dependencies such as software components, frameworks, or libraries that are required for deploying and executing the application.

As discussed herein, the term "container" refers to an instance of a container image, and an application executes within an execution environment provided by the container. In some aspects, a container is a form of encapsulation to limit a resource and restrict access to a process, which can involve packaging up software code and all its dependencies such that it can run uniformly and consistently on any infrastructure. Further, multiple instances of an application can be deployed from the same container image (e.g., where each application instance executes within its container). Containerization aims to decouple applications and associated structures for running the applications from the infrastructure on which they run. In some embodiments, containers can use persistent storage that is deliverable in a variety of ways, such as but not limited to software-defined in a container orchestrator and external systems.

As discussed herein, the term "persistent storage" refers to a data storage device that retains data after power to that device is shut off. As discussed herein, the term "pod" refers to a set of containers (e.g., executing on a cluster) that accesses shared resources (e.g., network, storage), and one or more pods can be executed by a given computing node. As discussed herein, the terms "cluster" and "container environment" are used interchangeably to indicate a set of compute nodes (e.g., worker machines or worker nodes) that run containerized applications. In some aspects, a cluster has at least one worker node.

The disclosed techniques can be used to configure a resilience testing manager in a computing environment, providing the ability for testing deployments to simulate workloads, network experiments scenarios in isolated environments, network failure scenarios, as well as to collect metrics and measure the impact of such workloads, network experiments, and network failure scenarios during data processing. Example network failure scenarios include one or more of the following types of network failures: operating system (OS) level failure (e.g., memory full, disk failure), service level failure (e.g., specific service failures such as warehouse malfunctioning), and Cloud environment level failure (e.g., a network failure).

As used herein, the term "workload" indicates one or more queries (or requests) that can be executed in a container environment. As used herein, the term "network experiments" (also referred to as "experiments" or "network failure experiments") indicates a set of manipulations that alter one or more hardware or software settings of the testing deployment to trigger at least one network failure. As disclosed herein, workloads and network experiments as part of a workflow, and a disclosed resilience testing manager is configured to perform resilience testing using such workflow.

In this regard, the resilience testing manager is configured to perform the disclosed techniques associated with long-term and short-term resilience testing plans and to provide platform and chaos environments in connection with data processing in a cloud computing platform. Also, the disclosed techniques can be used to implement and execute resilience testing to gain an understanding of a data processing system/feature's capability to withstand turbulent conditions in cloud computing scenarios. More specifically, the disclosed resilience testing techniques can be used to (a) identify key component scenarios (workloads) and major failure events (experiment) in interest, and build them in reusable components that can be shared within the cloud computing platform; (b) define steady-state of components with concrete measurements and metrics which could also identify abnormal states; and (c) build and implement multiple resilience plans that run testing scenarios within an isolated deployment environment with the simulation of various failures, in a continuous cadence, to monitor a tested component's stability.

The various embodiments that are described herein are described with reference where appropriate to one or more of the various figures. An example computing environment including a resilience testing manager (RTM) configured to perform resilience testing functions are discussed in connection with FIGS. 1-3. A more detailed description of the RTM is provided in connection with FIGS. 4-7. A more detailed discussion of example computing devices that may be used with the disclosed techniques is provided in connection with FIG. 8.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system (NBDS) 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 105 that facilitates storage of data on the cloud computing platform 101 (e.g., data management and access) and analysis functions (e.g. SQL queries, analysis), as well as other processing capabilities (e.g., configuring replication group objects as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as remote computing device or user device 114) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 101 (e.g., cloud computing service 105) by way of a network 106, such as the Internet or a private network. A data consumer 115 can use another computing device to access data of the data provider (e.g., data obtained via the client device 114).

In the description below, actions are ascribed to users, particularly consumers and providers. Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 105 in response to an instruction from that user. In some embodiments, the client device 114 is configured with an application connector 128, which may be configured to initiate customer-side actions such as initiating a query.

In some embodiments, the cloud computing platform 101 includes multiple network-based database systems (with NBDS 102 also referenced as NBDS 1 102 in FIG. 1). In this regard, cloud computing platform 101 includes NBDS 1 102, ..., NBDS N 103.

The cloud computing platform 101 can include a resilience testing manager (RTM) 132, which is configured to perform resilience testing functions (e.g., as discussed in connection with FIG. 4-FIG. 7). For example and as discussed in connection with FIGS. 4-7, RTM 132 can process a workflow received from a task scheduler to obtain a workload specification and a network experiment specification in connection with resilience testing. Additional functionalities associated with resilience testing are discussed in connection with FIGS. 4-7.

In some aspects, the resilience testing functions can be performed based on resilience testing (RT) configurations 134 generated by the RT configuration functions 130. In some embodiments, RT configurations 134 can be used for configuring metadata associated with workflows that are processed for resilience testing using a testing deployment. In other aspects, the RT configurations 134 can be used for configuring other parts of the workflow, such as a workload or a network experiment. In some embodiments, RTM 132 can be configured via a configuration node of the cloud computing platform 101 (e.g., by a network administrator of the cloud computing platform 101).

In some embodiments, RTM 132 is implemented within the cloud computing platform 101 but outside any of NBDS 1 102, ..., NBDS N 103. In this regard, RTM 132 can be configured to connect to (and control) any of NBDS 1 102, ..., NBDS N 103. For example, RTM 132 is configured to connect to the compute service manager 108 of NBDS 1 102 (or another functionality of NBDS 1 102) via network 136. Similarly, RTM 132 is configured to connect to the compute service manager of NBDS N 103 (or another functionality of NBDS N 103) via network 138. In some aspects, networks 136 and 138 include wired/wireless networks that are internal to the cloud computing platform 101.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata (e.g., account objects used in connection with a replication group object). Additionally, the metadata database 112 can also store the RT configurations 134. In some embodiments, the RT configurations 134 can be stored in storage platform 104 or cloud-storage platforms 122.

Figure 3:
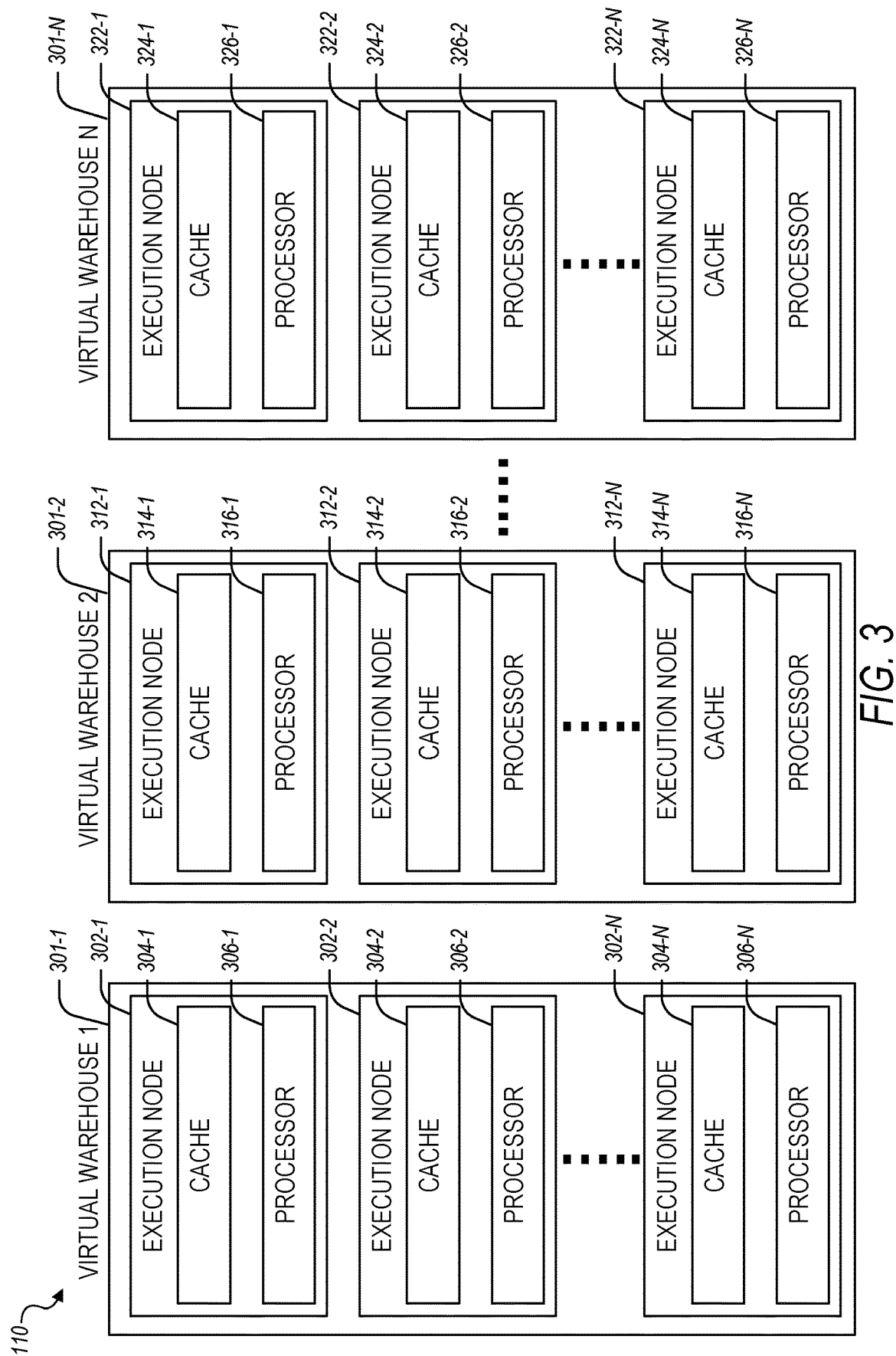
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 processes the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
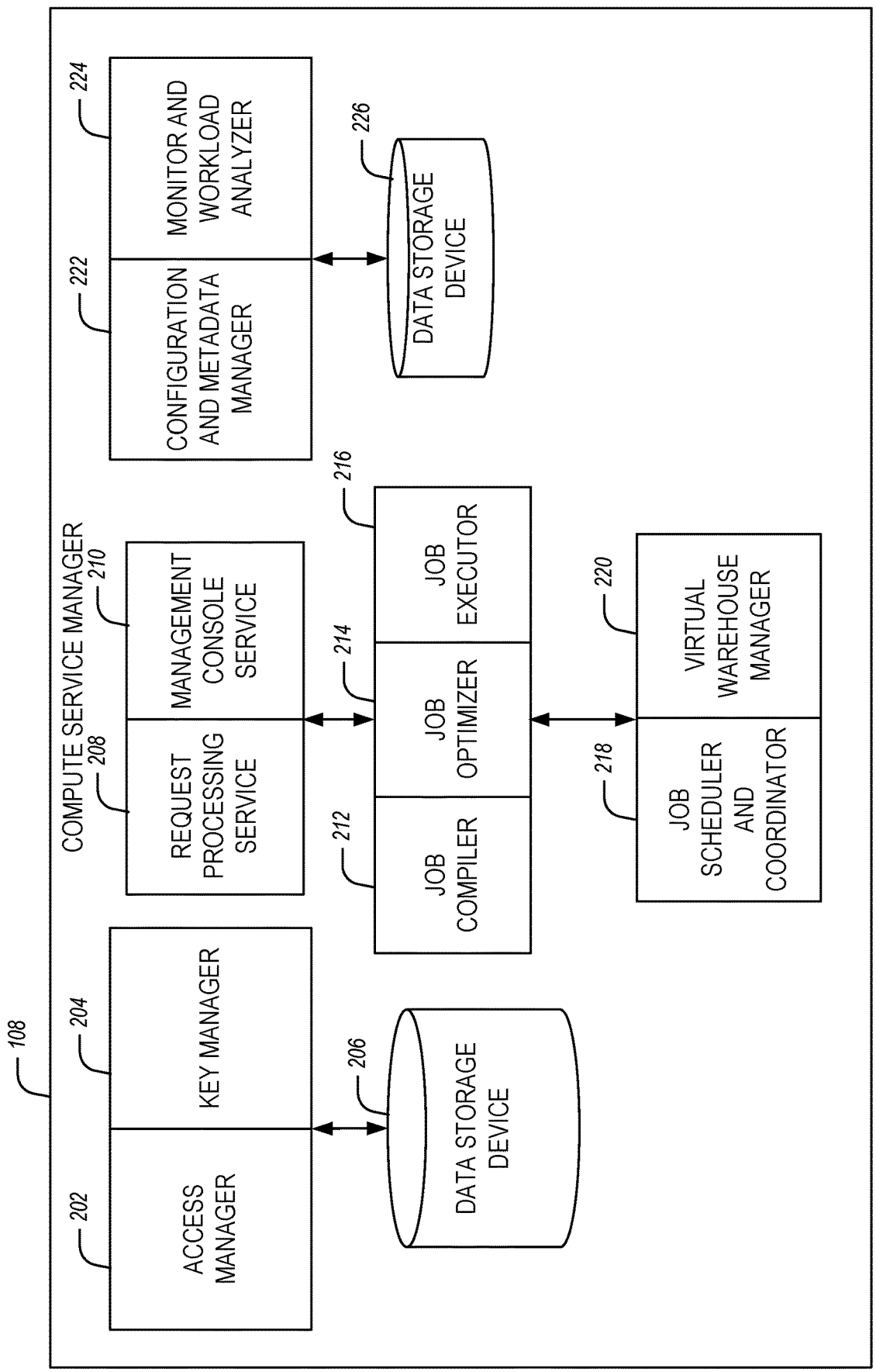
FIG. 2 is a block diagram illustrating the components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system (or key manager) 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless concerning the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 120-1), and does not download the files from the transferring node. In this way, lagging nodes can transfer files via file stealing in a way that does not worsen the load on the lagging nodes.

Although virtual warehouses 1, 2, and N are associated with the same execution platform 110, virtual warehouses 1, N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

The disclosed resilience testing techniques enables cloud computing platform feature owners to compose, and run, scalable end-to-end (E2E) workloads against a target environment (such as a test deployment using an execution node) in a declarative manner. In some aspects, the components of the overall workload are executed across a distributed set of machines (e.g., a set of containers forming a pod), and allow the overall workload to scale beyond the typical limits of a single software/single test node configuration. In some embodiments, the workloads are composed of smaller, more modular, workloads for re-use.

Advantages of the disclosed resilience testing techniques include the following: (a) ability to orchestrate multiple types of workloads (e.g, background workloads, chaos experiments, measurements, scaled environment workloads, and so forth) all together into one experiment run that can be scheduled and triggered automatically; (b) composability (e.g., declarative re-use/composability of existing workloads into experiment scenarios to perform different experiments targeting different deployments and use-cases); (c) extensibility (e.g., enable network-based database system customers to extend and build their own experiment scenarios and share with others); (d) extendability (e.g., ability for adding specific extensions/tools and reusing existing tools for specialized load/performance/chaos testing needs); (e) ability to simulate scaled workloads towards scaled, isolated, production-like deployments; and (f) ability to simulate different types of chaos and failures to deployments in a automated, reusable way.

Figure 4:
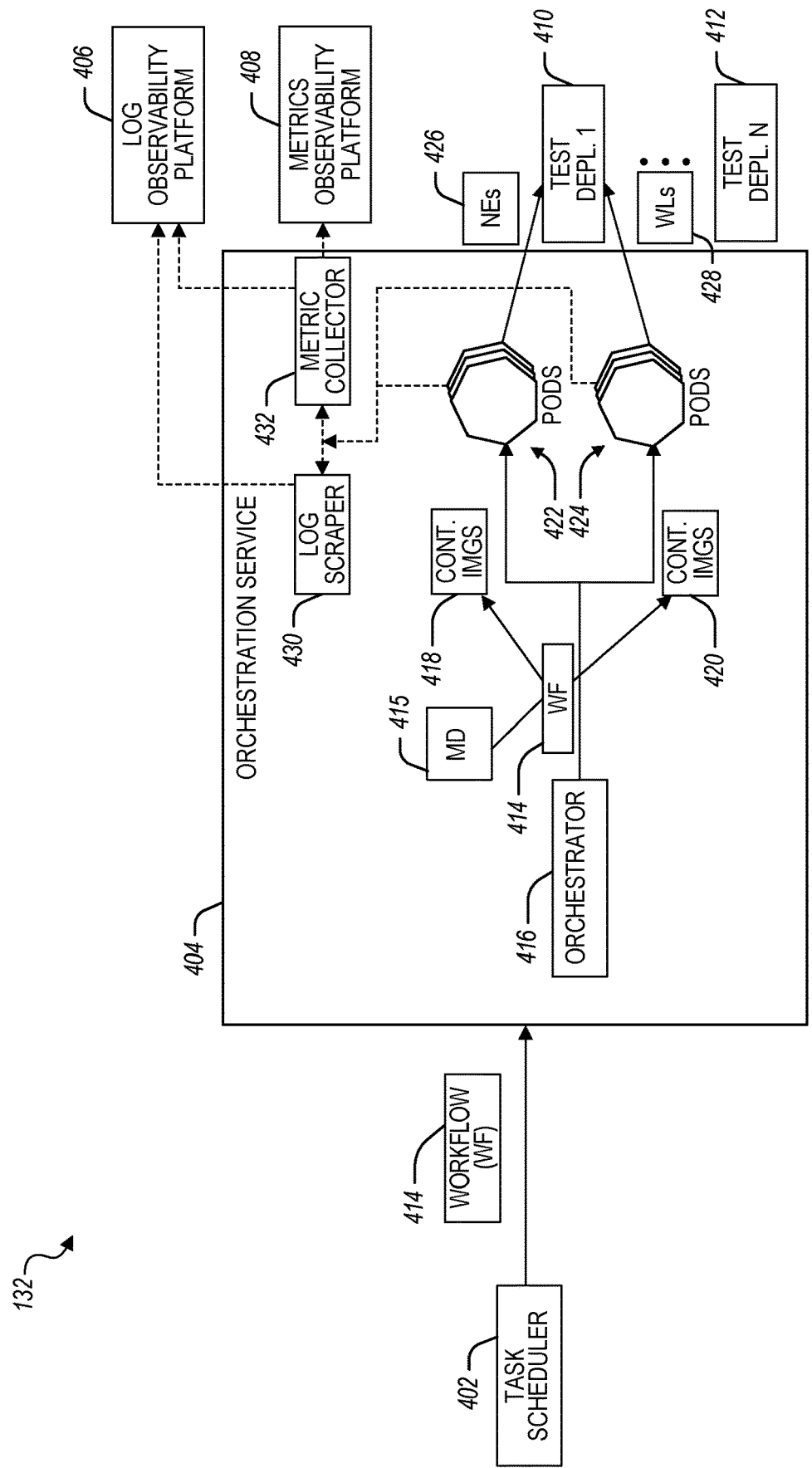
FIG. 4 is a block diagram of a resilience testing manager which can be used in the computing environment of FIG. 1, in accordance with some embodiments of the present disclosure.

FIG. 4 is a block diagram of a resilience testing manager which can be used in the computing environment of FIG. 1, in accordance with some embodiments of the present disclosure. Referring to FIG. 4, RTM 132 may include (or otherwise may be in communication with) a task scheduler 402, an orchestration service 404, a log observability platform 406, metrics observability platform 408, and test deployments 410, . . . , 412. Discretion service 404 may include an orchestrator 416, a log scraper service 430, and a metric collector service 432.

The task scheduler 402 is configured to generate a workflow 414 is communicated to orchestrator 416 for processing in connection with resilience testing. Workflow 414 includes at least one workload specification describing at least one workload (e.g., workloads 428) and at least one network experiment specification describing at least one network experiment (e.g., network experiments 426). Some embodiments, workflow 414 container images (e.g., container images 418, . . . , 420) where each container image configures at least one network experiment or at least one workload. In some embodiments, workflow 414 further includes metadata 415 which can be used as discussed herein below.

In some aspects, task scheduler 402 configures workflow 414 as a Jenkins job which is used as a trigger for initiating a resiliency test using the workflow. For example, when a Jenkins job starts, workflow 414 (describing workloads and network experiments of a resiliency test) is communicated to the orchestration service 404 for execution.

Orchestrator 416 decodes the received workflow to obtain multiple container images such as container images 418, . . . , 420. The container images are used to obtain metadata 415, a workload specification configuring workloads 428, and a network experiment specification configuring network experiments 426. In some aspects, orchestrator 416 is configured to translate a descriptive configuration into multiple executable commands (or queries) and sends them to workers (e.g., pods 422, 424) for execution on a test deployment.

In some embodiments, workloads 428 are sent from test environments for execution against isolated environments (e.g., one of the test deployments 410, . . . , 412). For different workflows, different types of workloads may be used (E.g., read-only workloads, write-only workloads, etc.) or their combinations. Workloads 428 may be executed for a pre-set period and scale.

In some embodiments, the orchestration service 404 may use a declarative workload (DEW) engine (not illustrated in FIG. 4) as a tool for implementing workload configuration (e.g., authoring), as well as a runtime for execution.

In some embodiments, network experiments 426 are sets of manipulations configured for application to a test deployment. For example, network experiments 426 can be used for scaling the deployment up or down and for triggering a network failure (e.g., draining memories or interrupting/terminating CPU processes, etc.). Similar to workloads, DEW may be used to configure/author the network experiments. In some aspects, orchestration service 404 and use existing experiment implementations used in prior resilience testing.

Network experiments 426 can be configured to use specialized techniques to generate unplanned behavior in targeted components of a target deployment. In some aspects, network experiments can include the following injection types for causing the unplanned behavior: SQL-based injection and OS-based injection.

In some embodiments, an SQL-based injection can be used for injecting faults into a test deployment. The network experiment using an SQL-based injection can include control measures in place that allow limiting the impact when used. The SQL-based injection can have access to application contexts that can be used to scope when they fire. Example configurations for this injection include configurations for a pre-existing, secured fault injection framework, pre-existing fault-injection locations, using the framework, where actions can be performed, extensions to inject failures into sub-systems, fault-injection locations, a better approximation of failure locations (e.g., manage calls to external dependencies), and fault-injection actions for a fault injection framework (e.g., perform JVM termination).

As these injections are SQL-based, a tool that can execute SQL can be used to trigger them. In some aspects, declarative and scripted options of a workload engine of the orchestration service 404 can be used as the primary tool to inject SQL-based failures into a test deployment and to perform any necessary validation of the resulting state of the deployment.

In some aspects, the network experiments 426 can include an operating system (OS)-based injection. For example, certain experiment scenarios are better triggered using OS-level primitives. When these techniques are used, it may be more challenging to limit the impact of the injection as the application context may be missing.

In some aspects, an OS-based injection may be configured with a secured mechanism for use on a given instance, or set of instances within the test deployment to perform one or more of block/disrupt disk input/output (I/O) (e.g., using Linux Kernel framework, Fuse, etc.); block/disrupt network connectivity; and resource overutilization (e.g., CPU, memory, storage). As such injections are OS-based, any script can introduce failure to the OS components. In some aspects, these scripts may be executable from the target instance, and any automated mechanisms for that may need to undergo suitable security scrutiny. In some aspects, each injection script may be configured to automatically reset the environment back to the original state after the injection is complete.

After orchestrator 416 obtains container images 418, . . . , 420, orchestrator 416 determines network experiments 426 and workloads 428 based on a network experiment specification and a workload specification corresponding to the container images. Orchestrator 416 configures the first set of containers 422 (which can correspond to a first pod) and a second set of containers 424 (which can correspond to a second pod) to execute on test deployment 410. For example, orchestrator 416 configures network experiments 426 to execute on the first set of containers 422 while the workloads 428 execute on the second set of containers 424, all using test deployment 410. In some embodiments, pods 422 and 424 use a connector to connect to compute service manager 108 (e.g., via internal network 136) of NBDS 1 102 to send a workload or send a command to cause a network failure scenario.

In an example embodiment, each test deployment of the available test deployments 410, . . . , 412 can be configured as a computing node (e.g., one or more of the execution nodes in execution platform 110).

Network experiments can have a detrimental behavior on the test deployment upon which they are executed. When network experiments are executed, they may mutate and/or otherwise damage the environment in which they run. In this regard, test deployments 410, . . . , 412 can be configured as isolated computing environments. For example, access by at least another workflow to compute and storage resources of the testing node of the test deployment can be isolated or controlled to configure the test deployment as an isolated computing environment. In some aspects, configuration changes to the testing node of the test deployment are monitored and reversed after the resilience testing configured by the workflow is completed.

In some embodiments, metadata 415 obtained from workflow 414 can include information for configuring execution of the network experiments 426 and the workloads 428. Example metadata 415 can include a duration value (e.g., for configuring a duration of execution of the network experiments 426 or workloads 428), a testing node specification (e.g., for selecting one of the test deployments 410, . . . , 412 based on the testing node specification), specific indication on which network experiments or workloads to execute, specific indication on which test deployment to use for the resilience testing, configurations for the first set of containers 422 and the second set of containers 424, etc. In some embodiments, metadata 415 can be stored in metadata database 112.

In some embodiments, RTM 132 further uses the log scraper service 430 to collect log data from the first set of containers 422 and the second set of containers 424 and store the log data for further processing in the log observability platform 406. RTM 132 also uses a metric collector service 432 to collect metrics from the first set of containers 422 and the second set of containers 424 (e.g., metrics associated with the execution of the network experiments 426 and workloads 428), which metrics are stored for further processing in the log observability platform 406 and the metrics observability platform 408.

Figure 5:
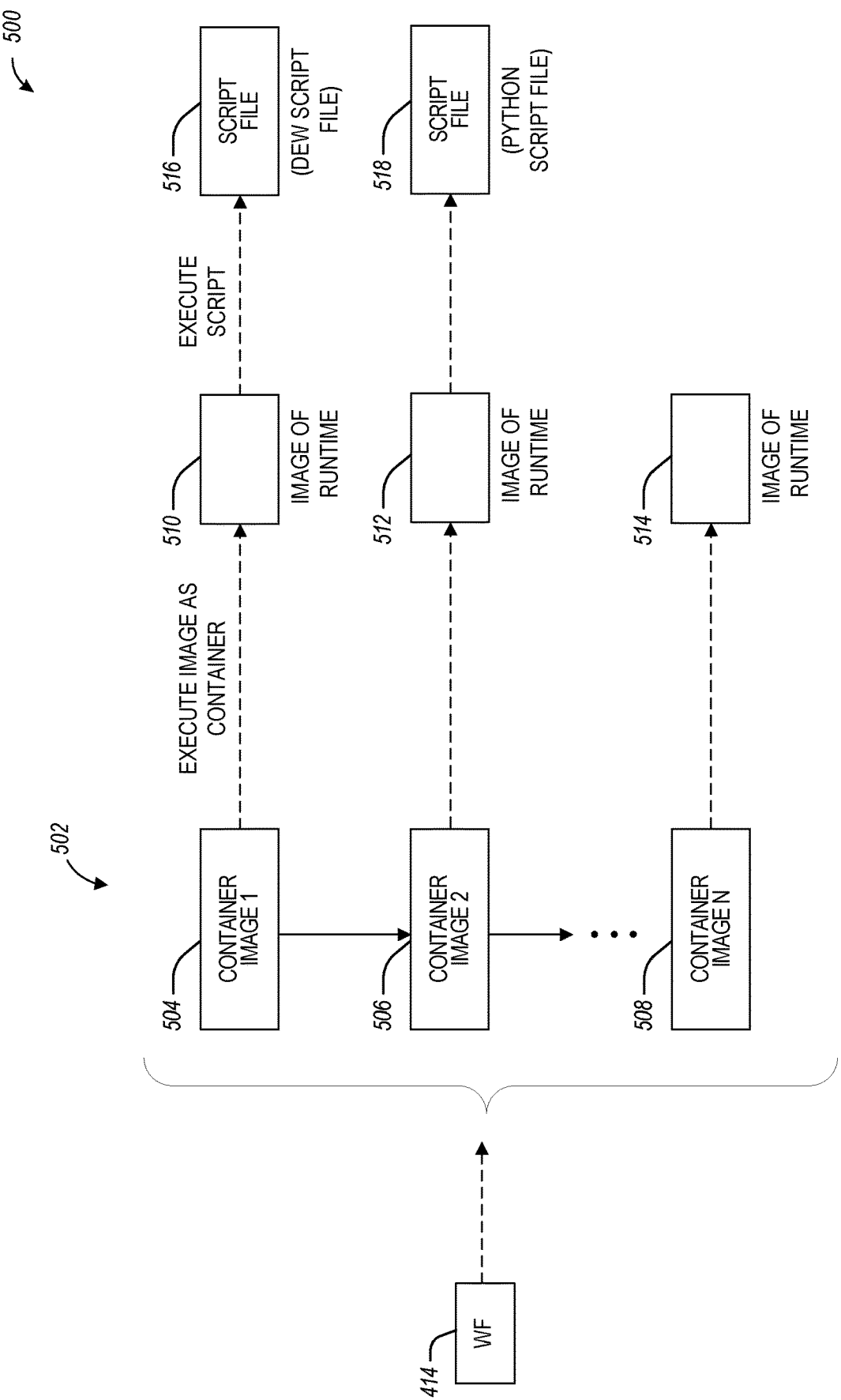
FIG. 5 is a block diagram illustrating an example workflow including multiple container images configured for sequential execution, according to some example embodiments.

FIG. 5 is a block diagram 500 illustrating an example workflow 414 including multiple container images configured for sequential execution, according to some example embodiments. Referring to FIG. 5, workflow 414 can include multiple container images 502, which include container images 504, 506, . . . , 508 configured for sequential execution. Each of the multiple container images 502 can configure at least one network experiment and/or at least one workload. In aspects when a single container image configures more than one task (associated with at least one network experiment and/or at least one workload), the tasks can be executed in a serial and/or parallel manner.

In some embodiments, container images 504, 506, . . . , 508 can be executed as corresponding containers 510, 512, . . . , 514 in a set of containers (e.g., the first set of containers 422 and the second set of containers 424) against an isolated test deployment (e.g., test deployment 410).

In some aspects, the container images are executed as corresponding containers by executing at least one preconfigured script. For example, container images 504 and 506 can be executed as corresponding containers 510 and 512 by executing corresponding scripts 516 (e.g., a DEW script file) and 518 (e.g., a Python script file).

Figure 6:
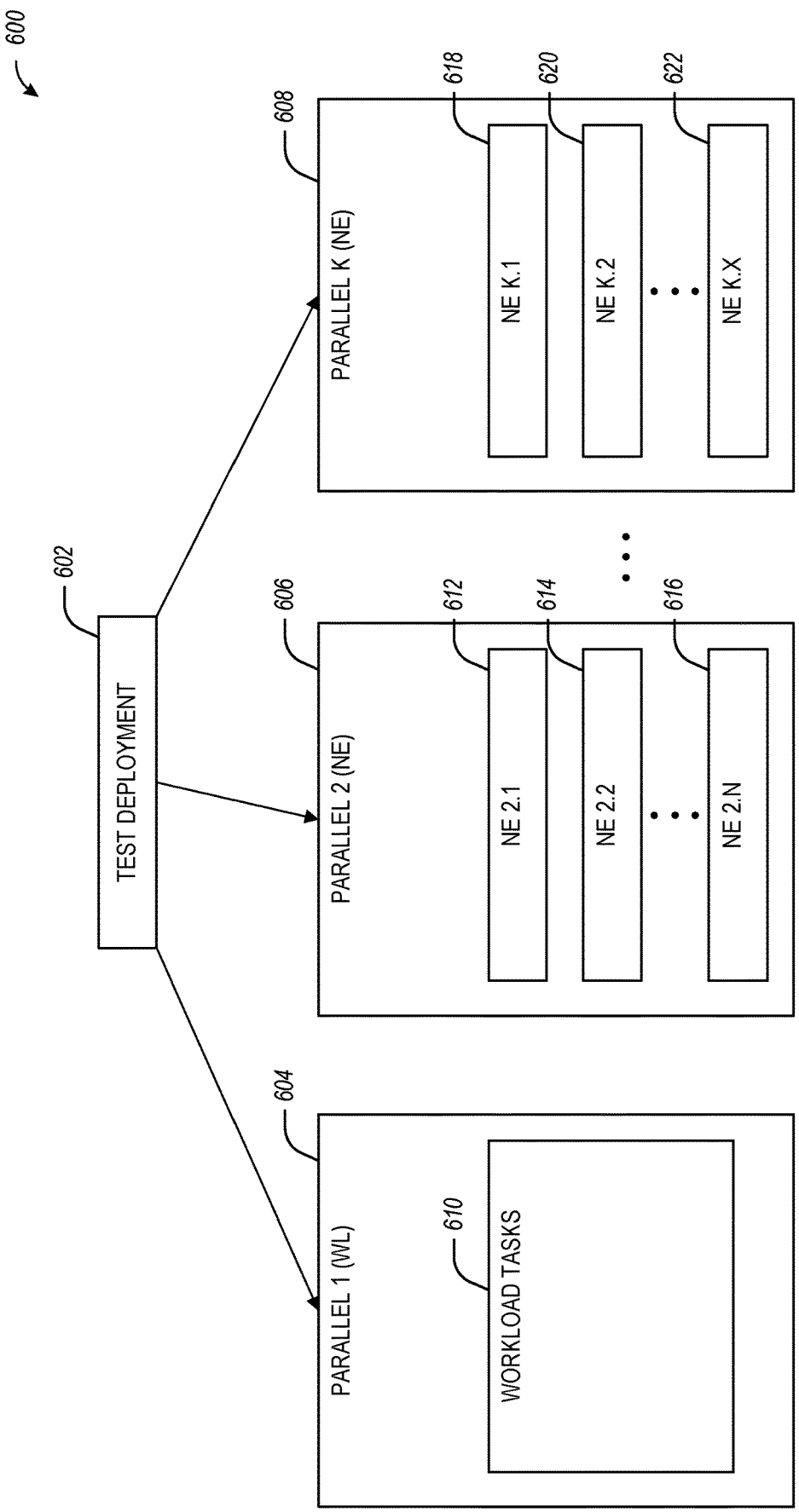
FIG. 6 is a block diagram illustrating the parallel execution of workload tasks and network experiments in a test deployment, in accordance with some embodiments of the present disclosure.

FIG. 6 is a block diagram 600 illustrating the parallel execution of workload tasks and network experiments in a test deployment 602, in accordance with some embodiments of the present disclosure. Referring to FIG. 6, workflow 414 may be parsed by orchestrator 416 to determine one or more network experiments and one or more workloads for execution on test deployment 602 as parallel task sets 604, 606, ..., 608. Task set 604 can include multiple workload tasks 610, which can be executed in a serial and/or parallel manner within task set 604. Task set 606 can include multiple network experiments 612, 614, ..., 616 which can be executed in a serial and/or parallel manner within task set 606. Similarly, task set 608 can include multiple network experiments 618, 620, ..., 622 which can be executed in a serial and/or parallel manner within task set 608.

Figure 7:
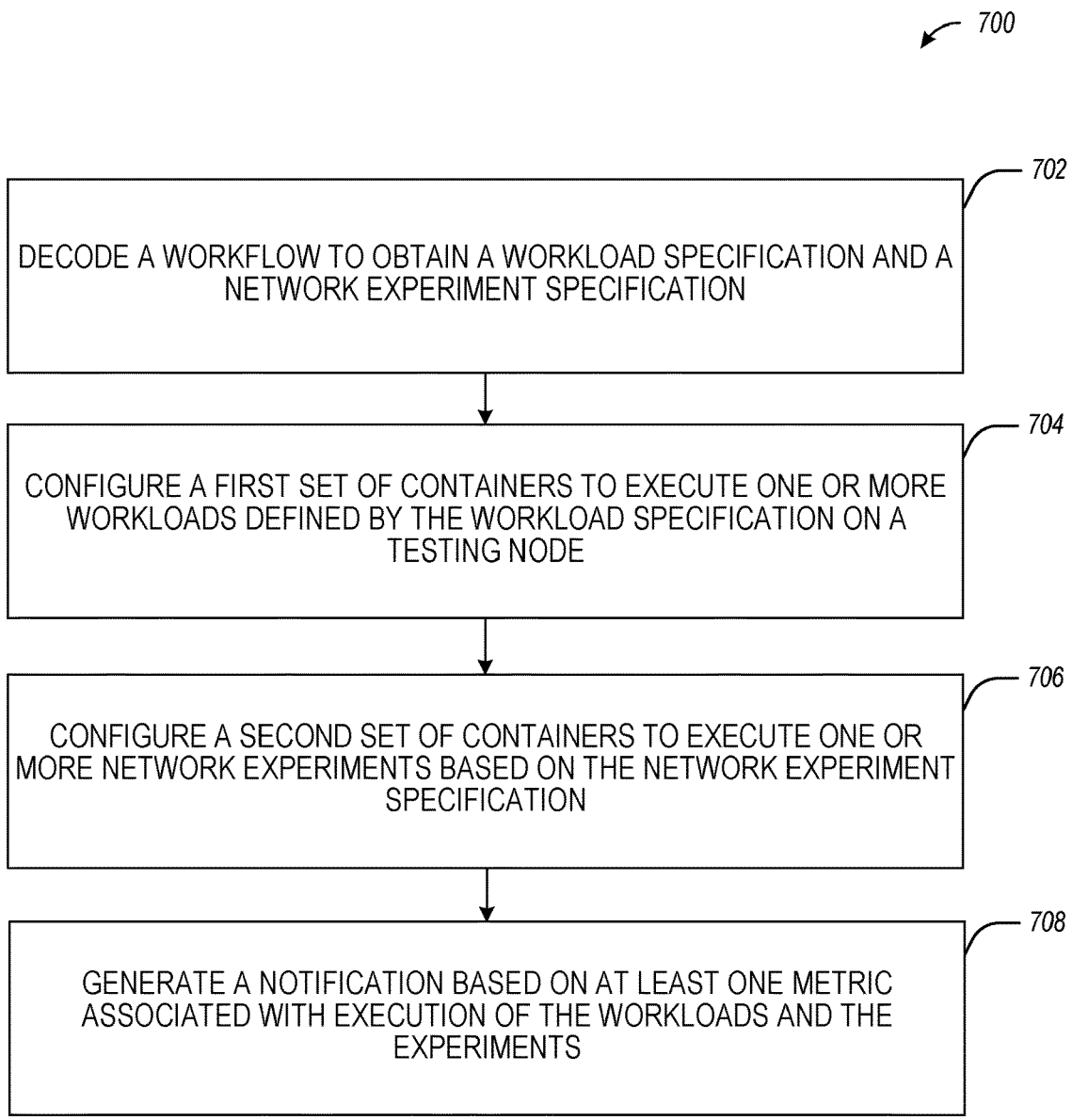
FIG. 7 is a flow diagram illustrating operations of a database system in performing a method for resilience testing, in accordance with some embodiments of the present disclosure.

FIG. 7 is a flow diagram illustrating operations of a database system in performing a method 700 for configuring managed event tables, in accordance with some embodiments of the present disclosure. Method 700 may be embodied in computer-readable instructions for execution by one or more hardware components (e.g., one or more processors) such that the operations of the method 700 may be performed by components of the network-based database system 102, such as a network node (e.g., a resilience testing manager 132 executing on a network node of the compute service manager 108) or a computing device (e.g., client device 114) which may be implemented as machine 800 of FIG. 8 performing the disclosed functions. Accordingly, method 700 is described below, by way of example with reference thereto. However, it shall be appreciated that method 700 may be deployed on various other hardware configurations and is not intended to be limited to deployment within the network-based database system 102.

At operation 702, a workflow is decoded to obtain a workload specification and a network experiment specification. For example, orchestrator 416 decodes workflow 414 received from the task scheduler 402 to obtain container images 418, ..., 420 which can correspond to a workload specification and a network experiment specification.

At operation 704, a first set of containers is configured to execute one or more workloads on a testing node. For example, orchestrator 416 configures a set of containers 424 to execute workloads 428, where workloads 428 are defined by the workload specification.

At operation 706, a second set of containers is configured to execute one or more network experiments on a testing node. For example, orchestrator 416 configures a set of containers 422 to execute network experiments 426, where network experiments 426 are defined by the network experiment specification. Execution of the one or more network experiments triggers an error condition on the testing node of test deployment 410.

At operation 708, a notification is generated based on at least one metric associated with the execution of the one or more workloads and the one or more network experiments. For example, the metric collector service 432 collects metrics associated with the execution of the workloads 428, and the network experiments 426 on the sets of containers 422 and 424. Orchestrator 416 or the metrics observability platform 408 can generate a notification based on the collected metrics.

In some embodiments, workflow 414 further includes metadata 415, which specifies a duration value and a testing node specification.

In some aspects, orchestrator 416 is further configured to select the testing node from a plurality of available testing nodes based on the testing node specification.

In an example embodiment, orchestrator 416 further configures a duration for the execution of the one or more network experiments based on the duration value.

In an example embodiment, access by at least a second workflow to compute and storage resources of the testing node is isolated to configure the testing node as an isolated testing deployment.

In some aspects, configuring the testing node as the isolated testing deployment further includes monitoring changes to the compute and storage resources caused by the error condition, and reversing the changes to the compute and storage resources after the execution of the one or more workloads and the network experiment.

In some embodiments, the one or more workloads include a plurality of queries, and the one or more network experiments include a plurality of network experiments. The orchestrator 416 further configures the first set of containers to execute the plurality of queries in parallel with the execution of the plurality of network experiments by the second set of containers.

In an example embodiment, orchestrator 416 or the log scraper service 430 further cause generation of at least one log associated with the execution of the one or more workloads and the one or more network experiments and storing the at least one log and the at least one metric in a shared database.

In some aspects, orchestrator 416 or the metrics observability platform 408 generates the notification when at least one metric exceeds a threshold value.

Figure 8:
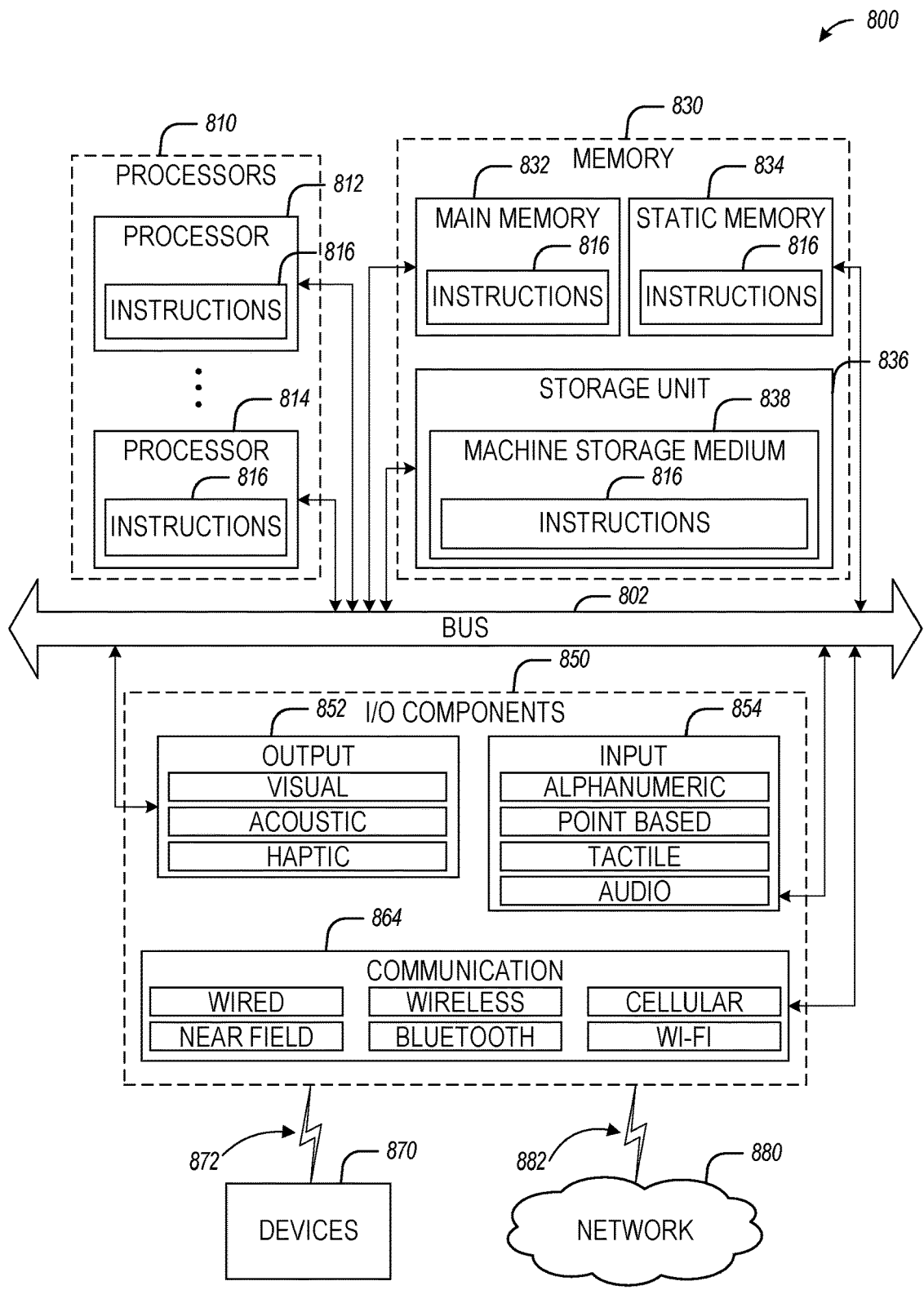
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, instructions 816 may cause machine 800 to execute any one or more operations of method 700 (or any other technique discussed herein, for example in connection with FIG. 4-FIG. 7). As another example, instructions 816 may cause machine 800 to implement one or more portions of the functionalities discussed herein. In this way, instructions 816 may transform a general, non-programmed machine into a particular machine 800 (e.g., the client device 114, the compute service manager 108, or a node in the execution platform 110) that is specially configured to carry out any one of the described and illustrated functions in the manner described herein. In yet another embodiment, instructions 816 may configure the client device 114, the compute service manager 108, and/or a node in the execution platform 110 to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

Machine 800 includes processors 810, memory 830, and input/output (I/O) components 850 configured to communicate with each other such as via a bus 802. In some example embodiments, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within machine storage medium 838 of the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The device 870 may be another machine or any of a wide variety of peripheral devices (e.g., a peripheral device coupled via a universal serial bus (USB)). For example, as noted above, machine 800 may correspond to any one of the client device 114, the compute service manager 108, or the execution platform 110, and the devices 870 may include the client device 114 or any other computing device described herein as being in communication with the network-based database system 102 or the cloud storage platform 104.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of several well-known transfer protocols (e.g., hypertext transfer protocol (HTTP)). Similarly, instructions 816 may be transmitted or received using a transmission medium via coupling 872 (e.g., a peer-to-peer coupling or another type of wired or wireless network coupling) to the device 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of method 700 may be performed by one or more processors. The performance of certain of the operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: decoding a workflow to obtain a workload specification and a network experiment specification; configuring a first set of containers to execute one or more workloads on a testing node, the one or more workloads defined by the workload specification; configuring a second set of containers to execute one or more network experiments on the testing node, the one or more network experiments based on the network experiment specification, and execution of the one or more network experiments triggering an error condition on the testing node; and generating a notification based on at least one metric associated with execution of the one or more workloads and the one or more network experiments.

In Example 2, the subject matter of Example 1 includes subject matter where the workflow further comprises metadata, the metadata specifying a duration value, and a testing node specification.

In Example 3, the subject matter of Example 2 includes subject matter where the at least one hardware processor further performs operations comprising: selecting the testing node from a plurality of available testing nodes based on the testing node specification.

In Example 4, the subject matter of Examples 2-3 includes subject matter where the at least one hardware processor further performs operations comprising: configuring a duration for execution of the one or more network experiments based on the duration value.

In Example 5, the subject matter of Examples 1-4 includes subject matter where the at least one hardware processor further performs operations comprising: isolating access by at least a second workflow to compute and storage resources of the testing node, to configure the testing node as an isolated testing deployment.

In Example 6, the subject matter of Example 5 includes subject matter where to configure the testing node as the isolated testing deployment, the at least one hardware processor further performs operations comprising: monitoring changes to the compute and storage resources caused by the error condition; and reversing the changes to the compute and storage resources after the execution of the one or more workloads and the network experiment.

In Example 7, the subject matter of Examples 1-6 includes subject matter where the one or more workloads comprise a plurality of queries, and the one or more network experiments comprise a plurality of network experiments.

In Example 8, the subject matter of Example 7 includes subject matter where the at least one hardware processor further performs operations comprising: configuring the first set of containers to execute the plurality of queries in parallel with execution of the plurality of network experiments by the second set of containers.

In Example 9, the subject matter of Examples 1-8 includes subject matter where the at least one hardware processor further performs operations comprising: generating at least one log associated with the execution of the one or more workloads and the one or more network experiments; and storing the at least one log and the at least one metric in a shared database.

In Example 10, the subject matter of Examples 1-9 includes subject matter where the at least one hardware processor further performs operations comprising: generating the notification when the at least one metric exceeds a threshold value.

Example 11 is a method comprising: decoding, by at least one hardware processor, a workflow to obtain a workload specification and a network experiment specification; configuring, by the at least one hardware processor, a first set of containers to execute one or more workloads on a testing node, the one or more workloads defined by the workload specification; configuring, by the at least one hardware processor, a second set of containers to execute one or more network experiments on the testing node, the one or more network experiments based on the network experiment specification, and execution of the one or more network experiments triggering an error condition on the testing node; and generating, by the at least one hardware processor, a notification based on at least one metric associated with execution of the one or more workloads and the one or more network experiments.

In Example 12, the subject matter of Example 11 includes subject matter where the workflow further comprises metadata, the metadata specifying a duration value, and a testing node specification.

In Example 13, the subject matter of Example 12 includes, selecting the testing node from a plurality of available testing nodes based on the testing node specification.

In Example 14, the subject matter of Examples 12-13 includes, configuring a duration for execution of the one or more network experiments based on the duration value.

In Example 15, the subject matter of Examples 11-14 includes, isolating access by at least a second workflow to compute and storage resources of the testing node, to configure the testing node as an isolated testing deployment.

In Example 16, the subject matter of Example 15 includes subject matter where configuring the testing node as the isolated testing deployment further comprises: monitoring changes to the compute and storage resources caused by the error condition and reversing the changes to the compute and storage resources after the execution of the one or more workloads and the network experiment.

In Example 17, the subject matter of Examples 11-16 includes subject matter where the one or more workloads comprise a plurality of queries, and the one or more network experiments comprise a plurality of network experiments.

In Example 18, the subject matter of Example 17 includes, configuring the first set of containers to execute the plurality of queries in parallel with execution of the plurality of network experiments by the second set of containers.

In Example 19, the subject matter of Examples 11-18 includes, generating at least one log associated with the execution of the one or more workloads and the one or more network experiments; and storing the at least one log and the at least one metric in a shared database.

In Example 20, the subject matter of Examples 11-19 includes, generating the notification when the at least one metric exceeds a threshold value.

Example 21 is a non-transitory computer-readable medium comprising instructions that, when executed by one or more processors of a machine, configure the machine to perform operations comprising: decoding a workflow to obtain a workload specification and a network experiment specification; configuring a first set of containers to execute one or more workloads on a testing node, the one or more workloads defined by the workload specification; configuring a second set of containers to execute one or more network experiments on the testing node, the one or more network experiments based on the network experiment specification, and execution of the one or more network experiments triggering an error condition on the testing node; and generating a notification based on at least one metric associated with execution of the one or more workloads and the one or more network experiments.

In Example 22, the subject matter of Example 21 includes subject matter where the workflow further comprises metadata, the metadata specifying a duration value, and a testing node specification.

In Example 23, the subject matter of Example 22 includes, the operations further comprising: selecting the testing node from a plurality of available testing nodes based on the testing node specification.

In Example 24, the subject matter of Examples 22-23 includes, the operations further comprising: configuring a duration for execution of the one or more network experiments based on the duration value.

In Example 25, the subject matter of Examples 21-24 includes, the operations further comprising: isolating access by at least a second workflow to compute and storage resources of the testing node, to configure the testing node as an isolated testing deployment.

In Example 26, the subject matter of Example 25 includes subject matter where the operations for configuring the testing node as the isolated testing deployment further comprise: monitoring changes to the compute and storage resources caused by the error condition; and reversing the changes to the compute and storage resources after the execution of the one or more workloads and the network experiment.

In Example 27, the subject matter of Examples 21-26 includes subject matter where the one or more workloads comprise a plurality of queries, and the one or more network experiments comprise a plurality of network experiments.

In Example 28, the subject matter of Example 27 includes, the operations further comprising: configuring the first set of containers to execute the plurality of queries in parallel with execution of the plurality of network experiments by the second set of containers.

In Example 29, the subject matter of Examples 21-28 includes, the operations further comprising: generating at least one log associated with the execution of the one or more workloads and the one or more network experiments; and storing the at least one log and the at least one metric in a shared database.

In Example 30, the subject matter of Examples 21-29 includes, the operations further comprising: generating the notification when the at least one metric exceeds a threshold value.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
    at least one hardware processor; and
    at least one memory storing instructions that cause the at least one hardware processor to perform operations comprising:
        decoding a workflow to obtain a workload specification and a network experiment specification;
        configuring a first set of containers to execute one or more workloads on a testing node, the one or more workloads defined by the workload specification;
        configuring a second set of containers to execute one or more network experiments on the testing node, the one or more network experiments based on the network experiment specification, and execution of the one or more network experiments triggering an error condition on the testing node; and
        generating a notification based on at least one metric associated with execution of the one or more workloads and the one or more network experiments.

2. The system of claim 1, wherein the workflow further comprises metadata, the metadata specifying a duration value and a testing node specification.

3. The system of claim 2, wherein the at least one hardware processor further performs operations comprising:
    selecting the testing node from a plurality of available testing nodes based on the testing node specification.

4. The system of claim 2, wherein the at least one hardware processor further performs operations comprising:
    configuring a duration for execution of the one or more network experiments based on the duration value.

5. The system of claim 1, wherein the at least one hardware processor further performs operations comprising:
    isolating access by at least a second workflow to compute and storage resources of the testing node, to configure the testing node as an isolated testing deployment.

6. The system of claim 5, wherein to configure the testing node as the isolated testing deployment, the at least one hardware processor further performs operations comprising:
    monitoring changes to the compute and storage resources caused by the error condition; and
    reversing the changes to the compute and storage resources after the execution of the one or more workloads and the network experiment.

7. The system of claim 1, wherein the one or more workloads comprise a plurality of queries, and the one or more network experiments comprise a plurality of network experiments.

8. The system of claim 7, wherein the at least one hardware processor further performs operations comprising:
    configuring the first set of containers to execute the plurality of queries in parallel with execution of the plurality of network experiments by the second set of containers.

9. The system of claim 1, wherein the at least one hardware processor further performs operations comprising:
    generating at least one log associated with the execution of the one or more workloads and the one or more network experiments; and
    storing the at least one log and the at least one metric in a shared database.

10. The system of claim 1, wherein the at least one hardware processor further performs operations comprising:
    generating the notification when the at least one metric exceeds a threshold value.

11. A method comprising:
    decoding, by at least one hardware processor, a workflow to obtain a workload specification and a network experiment specification;
    configuring, by the at least one hardware processor, a first set of containers to execute one or more workloads on a testing node, the one or more workloads defined by the workload specification;
    configuring, by the at least one hardware processor, a second set of containers to execute one or more network experiments on the testing node, the one or more network experiments based on the network experiment specification, and execution of the one or more network experiments triggering an error condition on the testing node; and
    generating, by the at least one hardware processor, a notification based on at least one metric associated with execution of the one or more workloads and the one or more network experiments.

12. The method of claim 11, wherein the workflow further comprises metadata, the metadata specifying a duration value and a testing node specification.

13. The method of claim 12, further comprising:
selecting the testing node from a plurality of available testing nodes based on the testing node specification.

14. The method of claim 12, further comprising:
configuring a duration for execution of the one or more network experiments based on the duration value.

15. The method of claim 11, further comprising:
isolating access by at least a second workflow to compute and storage resources of the testing node, to configure the testing node as an isolated testing deployment.

16. The method of claim 15, wherein configuring the testing node as the isolated testing deployment further comprises:
monitoring changes to the compute and storage resources caused by the error condition; and
reversing the changes to the compute and storage resources after the execution of the one or more workloads and the network experiment.

17. The method of claim 11, wherein the one or more workloads comprise a plurality of queries, and the one or more network experiments comprise a plurality of network experiments.

18. The method of claim 17, further comprising:
configuring the first set of containers to execute the plurality of queries in parallel with execution of the plurality of network experiments by the second set of containers.

19. The method of claim 11, further comprising:
generating at least one log associated with the execution of the one or more workloads and the one or more network experiments; and
storing the at least one log and the at least one metric in a shared database.

20. The method of claim 11, further comprising:
generating the notification when the at least one metric exceeds a threshold value.

21. A non-transitory computer-readable medium comprising instructions that, when executed by one or more processors of a machine, configure the machine to perform operations comprising:
decoding a workflow to obtain a workload specification and a network experiment specification;
configuring a first set of containers to execute one or more workloads on a testing node, the one or more workloads defined by the workload specification;
configuring a second set of containers to execute one or more network experiments on the testing node, the one or more network experiments based on the network experiment specification, and execution of the one or more network experiments triggering an error condition on the testing node; and
generating a notification based on at least one metric associated with execution of the one or more workloads and the one or more network experiments.

22. The non-transitory computer-readable medium of claim 21, wherein the workflow further comprises metadata, the metadata specifying a duration value and a testing node specification.

23. The non-transitory computer-readable medium of claim 22, the operations further comprising:
selecting the testing node from a plurality of available testing nodes based on the testing node specification.

24. The non-transitory computer-readable medium of claim 22, the operations further comprising:
configuring a duration for execution of the one or more network experiments based on the duration value.

25. The non-transitory computer-readable medium of claim 21, the operations further comprising:
isolating access by at least a second workflow to compute and storage resources of the testing node, to configure the testing node as an isolated testing deployment.

26. The non-transitory computer-readable medium of claim 25, wherein the operations for configuring the testing node as the isolated testing deployment further comprise:
monitoring changes to the compute and storage resources caused by the error condition; and
reversing the changes to the compute and storage resources after the execution of the one or more workloads and the network experiment.

27. The non-transitory computer-readable medium of claim 21, wherein the one or more workloads comprise a plurality of queries, and the one or more network experiments comprise a plurality of network experiments.

28. The non-transitory computer-readable medium of claim 27, the operations further comprising:
configuring the first set of containers to execute the plurality of queries in parallel with execution of the plurality of network experiments by the second set of containers.

29. The non-transitory computer-readable medium of claim 21, the operations further comprising:
generating at least one log associated with the execution of the one or more workloads and the one or more network experiments; and
storing the at least one log and the at least one metric in a shared database.

30. The non-transitory computer-readable medium of claim 21, the operations further comprising:
generating the notification when the at least one metric exceeds a threshold value.

* * * * *